(12) United States Patent
Murashima (10) Patent No.: US 8,330,851 B2
(45) Date of Patent: Dec. 11, 2012

(54) IMAGE PICKUP APPARATUS WITH MOVABLE HALF MIRROR FOR AUTO FOCUSING

(75) Inventor: Nobuharu Murashima, Nara (JP)

(73) Assignee: Sony Corporation, Tokyo (JP)

( * ) Notice: Subject to any disclaimer, the term of this patent is extended or adjusted under 35 U.S.C. 154(b) by 694 days.

(21) Appl. No.: 12/535,921

(22) Filed: Aug. 5, 2009

(65) Prior Publication Data

US 2010/0045853 A1 Feb. 25, 2010

(30) Foreign Application Priority Data

Aug. 25, 2008 (JP) ................................. 2008-214918

(51) Int. Cl.
*G03B 13/00* (2006.01)
*H04N 5/238* (2006.01)

(52) U.S. Cl. ......... 348/350; 348/351; 348/354; 348/364

(58) Field of Classification Search .................. 348/345, 348/350–351, 353
See application file for complete search history.

(56) References Cited

U.S. PATENT DOCUMENTS

| 7,628,550 B2 * | 12/2009 | Okumura | 396/358 |
| 7,747,156 B2 * | 6/2010 | Takase et al. | 396/111 |
| 7,889,268 B2 * | 2/2011 | Terada | 348/345 |
| 7,978,256 B2 * | 7/2011 | Kunishige et al. | 348/353 |
| 2006/0203350 A1 * | 9/2006 | Nakano et al. | 359/629 |

FOREIGN PATENT DOCUMENTS

| JP | 2000-321657 | 11/2000 |
| JP | 2005-292562 | 10/2005 |
| JP | 2006-197406 | 7/2006 |
| JP | 2006-270183 | 10/2006 |
| JP | 2006-350253 | 12/2006 |
| JP | 2008-129402 | 6/2008 |

* cited by examiner

*Primary Examiner* — Ngoc-Yen Vu
(74) *Attorney, Agent, or Firm* — Oblon, Spivak, McClelland, Maier & Neustadt, L.L.P.

(57) ABSTRACT

An image pickup apparatus including a half mirror, a phase difference detecting AF sensor, an image pickup device, and a display is provided. The half mirror is provided so as to be movable between a first position on an optical path of the subject image light from the photographing optical system and a second position to which the half mirror is evacuated from the optical path of the subject image light. When the half mirror is in the second position, the image pickup device generates an actual photographing image on the basis of the subject image light reaching the image pickup device from the photographing optical system without passing through the half mirror.

8 Claims, 9 Drawing Sheets

| α (DEGREES) | Ra = L/L0 | θ (DEGREES) |
|---|---|---|
| 50 | 0.923 | 80 |
| 55 | 0.863 | 70 |
| 60 | 0.816 | 60 |
| 65 | 0.780 | 50 |
| 70 | 0.752 | 40 |
| 75 | 0.732 | 30 |
| 80 | 0.718 | 20 |

IMAGE PICKUP APPARATUS WITH MOVABLE HALF MIRROR FOR AUTO FOCUSING

BACKGROUND OF THE INVENTION

1. Field of the Invention

The present invention relates to an image pickup apparatus such as a digital camera.

2. Description of the Related Art

There is proposed a digital camera which is capable of simultaneously performing phase difference detecting AF by a phase difference detecting AF sensor and live view in which time-series images for determining a picture composition are electronically displayed on a display (for example, Japanese Unexamined Patent Application Publication No. 2006-197406).

In a digital camera described in Japanese Unexamined Patent Application Publication No. 2006-197406, a half mirror (Pericle mirror) is provided so as to be fixed in a camera body. Light reflected on the half mirror reaches an AF sensor unit to be used for phase difference detecting AF. On the other hand, light passing through the half mirror reaches an image pickup device to be used for generating subject images. Time-series subject images to be generated are displayed as live-view images on a display such as a liquid crystal display.

SUMMARY OF THE INVENTION

However, in such a technology as described above, a half mirror is fixed to a camera body. Therefore, in actual photographing (in capturing a still image for record), light passing through the half mirror is used. That is, typically, an actual photographing image is generated using light passing through the half mirror at a predetermined transmittance to reach an image pickup device. As a result, a sufficient quantity of light may not be obtained in the image pickup device in actual photographing.

It is desirable to provide an image pickup apparatus capable of obtaining a sufficient quantity of light used in actual photographing in a configuration capable of simultaneously performing phase difference detecting AF and live view.

According to an embodiment of the present invention, there is provided an image pickup apparatus including a half mirror, a phase difference detecting AF sensor, an image pickup device, and display means. The half mirror separates light from a photographing optical system into transmitted light and reflected light. The phase difference detecting AF sensor receives the reflected light reflected on the half mirror to detect a focusing state by a phase difference detecting method. The image pickup device receives the transmitted light passing through the half mirror to generate time-series images with respect to subject image light from the photographing optical system. The display means sequentially display the time-series images generated by the image pickup device. In the apparatus, the half mirror is provided so as to be movable between a first position on an optical path of the subject image light from the photographing optical system and a second position to which the half mirror is evacuated from the optical path of the subject image light, and when the half mirror is in the second position, the image pickup device generates an actual photographing image on the basis of the subject image light reaching the image pickup device from the photographing optical system without passing through the half mirror.

In accordance with the present invention, it is possible to prevent a drop in quantity of light in actual photographing.

DESCRIPTION OF THE PREFERRED EMBODIMENT

1. First Embodiment

1-1. Configuration Outline

Figure 1:
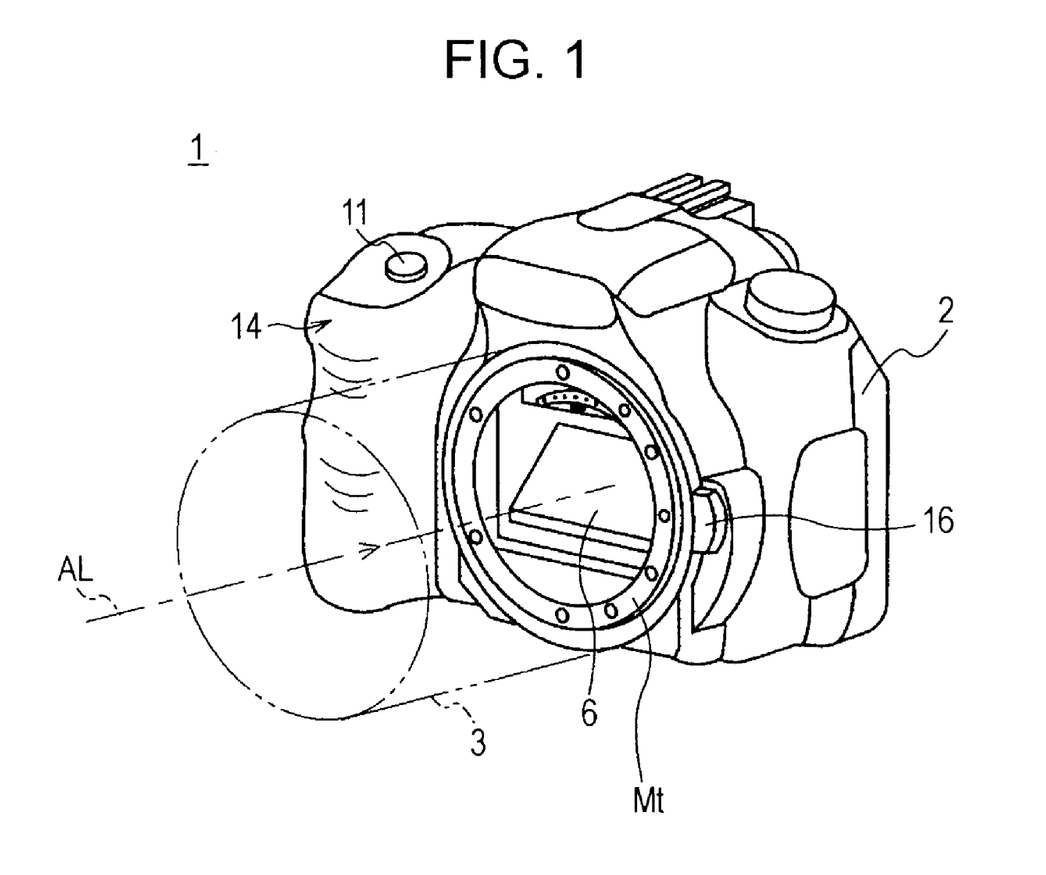
FIG. 1 is a perspective view of an external configuration of an image pickup apparatus according to an embodiment of the present invention.

FIG. 1 is a perspective view showing an external configuration of an image pickup apparatus 1 according to an embodiment of the present invention. The image pickup apparatus 1 is configured as a digital camera with interchangeable lenses. Note that the image pickup apparatus 1 is not a so-called single-lens reflex type camera. As will be described later, in the image pickup apparatus 1, it is possible to determine a picture composition through live view.

As shown in FIG. 1, the image pickup apparatus 1 includes a camera main body (apparatus main body) 2. An interchangeable type (demountable type) photographing lens unit (interchangeable lens) 3 is allowed to be mounted to the camera main body 2. Note that FIG. 1 shows a state in which the photographing lens unit 3 is demounted from the camera main body 2. However, a photographing operation is performed in a state in which the photographing lens unit 3 is mounted to the camera main body 2.

The photographing lens unit 3 is configured of mainly a camera cone, a lens group 37 (refer to FIG. 4) provided inside the camera cone, a diaphragm, and the like. The lens group 37 (photographing optical system) includes a focus lens that moves in the direction of an optical axis AL to change a focal position, and the like.

The camera main body 2 includes a toric mount Mt onto which the photographing lens unit 3 is mounted substantially in the center on its front face, and includes near the toric mount Mt a mounting/demounting button 16 for mounting and demounting the photographing lens unit 3.

Further, the camera main body 2 includes at the left end on its front face a grip portion 14 for a photographer to grip the camera main body 2. A release button 11 to give an instruction to start exposure is provided on the top face of the grip portion 14. A battery storage room and a card storage room are provided inside the grip portion 14. Batteries such as lithium ion batteries or the like are stored as a power source for the camera in the battery storage room, and a removable memory card 90 (refer to FIG. 4) to record image data of photographed images therein is stored in the card storage room.

The release button 11 is a two-step detection button capable of detecting two states of a half-push state (S1 state) and a full-push state (S2 state). When the release button 11 is half-pushed to come into an S1 state, a preparative operation (for example, an AF control operation or the like) for capturing a still image for record with respect to a subject (actual photographing image) is performed. Further, when the release button 11 is further pushed down to come into an S2 state, a photographing operation for the actual photographing image is performed. Specifically, an exposure operation with respect to subject image light (optical image of the subject) is performed using an image pickup device 5 which will be described later, and a series of operations for performing predetermined image processing on an image signal obtained by the exposure operation is carried out. In this way, when the release button 11 is brought into a half-push state S1, the image pickup apparatus 1 determines that an instruction to prepare photographing is given and performs a photographing preparative operation. Further, when the release button 11 is brought into a full-push state S2, the image pickup apparatus 1 determines that a photographing instruction is given and performs an actual photographing operation.

Figure 2:
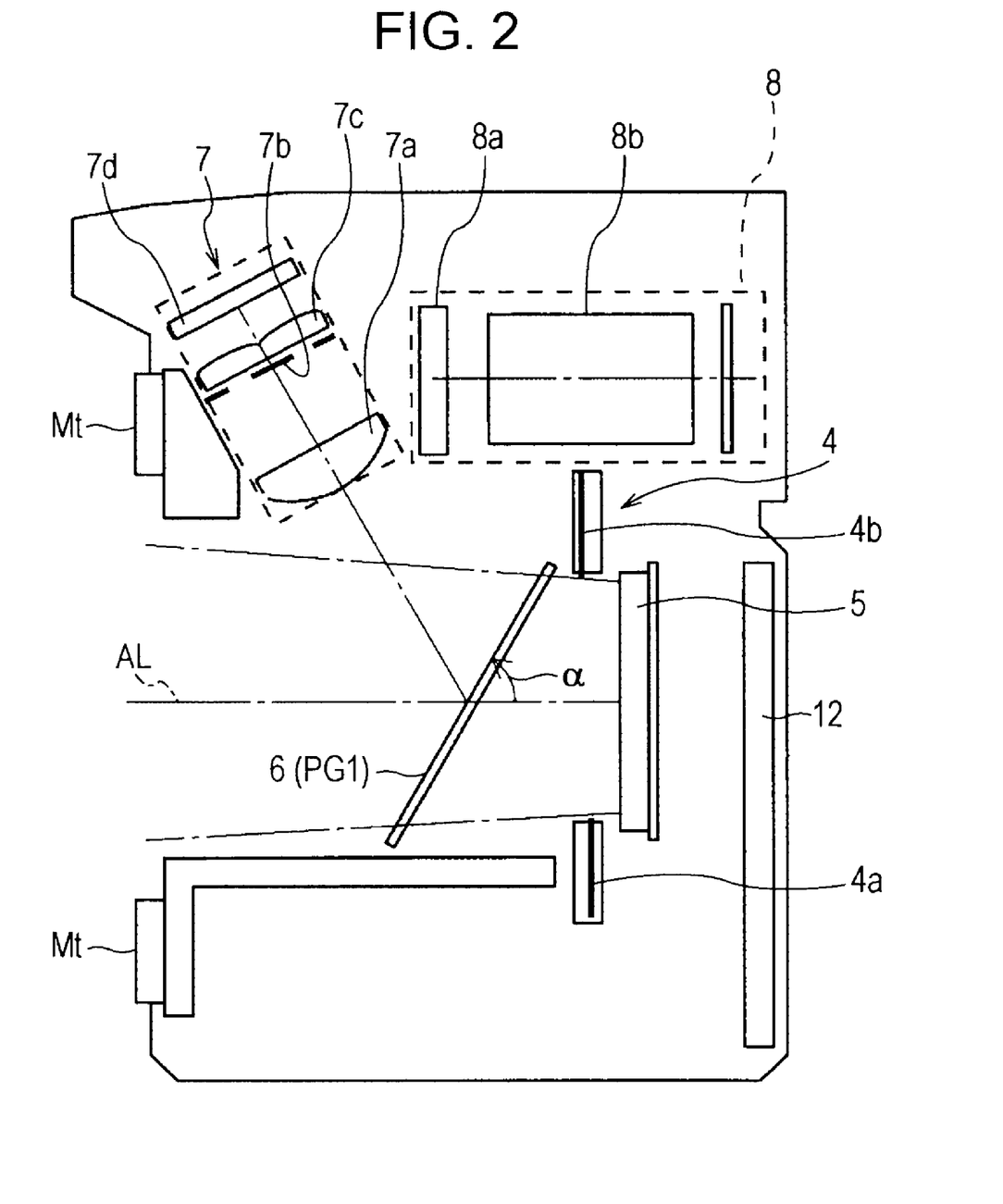
FIG. 2 is a cross sectional view of the image pickup apparatus in a mirror-down state.
Figure 3:
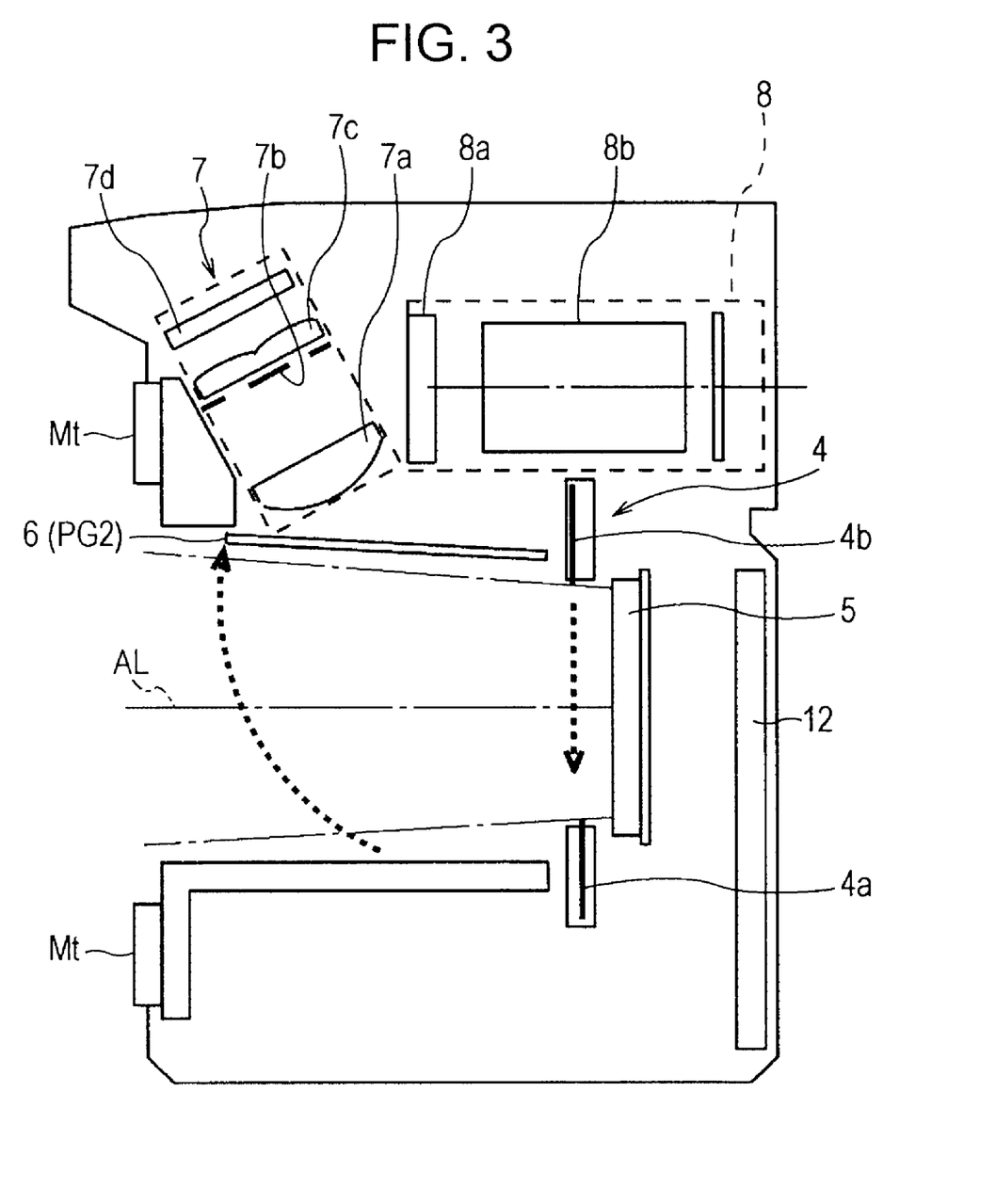
FIG. 3 is a cross sectional view of the image pickup apparatus in a mirror-up state.

FIGS. 2 and 3 are cross sectional views of the image pickup apparatus 1. FIG. 2 shows a state in which a half mirror 6 is in a mirror-down position PG1 (mirror-down state), and FIG. 3 shows a state in which the half mirror 6 is in a mirror-up position PG2 (mirror-up state).

As shown in FIG. 2 and others, the image pickup apparatus 1 includes a shutter device 4, the image pickup device 5, the half mirror 6, an AF sensor 7, an electronic viewfinder 8, and a backface monitor 12.

The half mirror 6 is a movable half mirror. The half mirror 6 is provided so as to be movable between a position (mirror-down position) PG1 which is on an optical path of subject image light from a photographing optical system as shown in FIG. 2 and a position (mirror-up position) PG2 to which the half mirror 6 is evacuated from the position PG1 on the optical path of the subject image light from the photographing optical system as shown in FIG. 3.

As shown in FIG. 2, the half mirror 6 in a mirror-down state is on the optical path (photographing optical path) from the photographing lens unit 3 up to the image pickup device 5.

At this time, the half mirror 6 separates light (subject image light) from the photographing lens unit 3 into transmitted light and reflected light. That is, the half mirror 6 is a semi-transmissive mirror.

Here, a transmittance of the half mirror 6 may be not necessarily 50%. A transmittance of the half mirror 6 may be 30% or 70%, for example.

In FIG. 2, the AF sensor 7 is provided in the diagonally upper left of the half mirror 6 in a mirror-down state. The AF sensor 7 is a phase difference detecting AF sensor that detects a focusing state by a phase difference detecting method. Specifically, the AF sensor 7 has a condenser lens 7a, a diaphragm 7b, a separator lens 7c, and a line sensor 7d. The AF sensor 7 is capable of receiving light reflected on a reflection plane of the half mirror 6 in a mirror-down state to detect a focusing state of a subject by a focusing state detection method using a phase difference detecting technique.

Further, the image pickup device 5 is provided on the right side of the half mirror 6 in a mirror-down state in FIG. 2.

The image pickup device (for example, CCD sensor) 5 is a light-receiving device that converts an optical image of a subject (subject image light) from the photographing lens unit 3 into an electrical signal (image signal) by photoelectric conversion.

The image pickup device 5 is capable of generating and obtaining an actual photographing image (still image for record) and is capable of capturing live-view images (time-series images for determining a picture composition (moving images)).

For example, as will be described later, the image pickup device 5 captures an actual photographing image when the half mirror 6 is in the mirror-up position PG2 (refer to FIG. 3). Specifically, the image pickup device 5 receives subject image light traveling directly from the photographing lens unit 3 (in other words, subject image light traveling to reach the image pickup device 5 without passing through the half mirror 6 in the evacuated position) and generates and obtains an actual photographing image.

Further, the image pickup device 5 captures a live-view image when the half mirror 6 is in the mirror-down position PG1 (refer to FIG. 2). Specifically, the image pickup device 5 receives transmitted light passing through the half mirror 6 and generates time-series images with respect to subject image light. That is, the image pickup device 5 generates and captures an image for live view using the subject image light passing through the half mirror 6.

Further, as shown in FIG. 2, the backface monitor 12 is provided on the back face of the camera main body 2. The backface monitor 12 is configured as, for example, a color liquid crystal display (LCD).

The backface monitor 12 is capable of displaying a menu screen for setting photographing conditions and the like and displaying thereon photographed images recorded in the memory card 90 (refer to FIG. 4) to be played back in a playback mode.

Further, the backface monitor 12 is capable of displaying a plurality of time-series images (i.e., moving images) captured by the image pickup device 5 as live-view images. In the image pickup apparatus 1 according to the embodiment, it is possible to determine a picture composition using a live-view image displayed on the backface monitor 12.

Further, as shown in FIG. 2, the electronic viewfinder 8 is provided on the upper side of the back face of the camera main body 2.

The electronic viewfinder 8 includes an LCD (liquid crystal display) 8a and an eyepiece lens 8b. The plurality of time-series images (i.e., moving images) captured by the image pickup device 5 are displayed as live-view images on the LCD 8a. The subject image electronically displayed on the LCD 8a further travels toward the back side of the camera main body 2 via the eyepiece lens 8b. It is possible for an operator to perform a picture composition determining operation by visually checking the live-view image displayed on the LCD 8a via the eyepiece lens 8b.

In this way, in the present embodiment, a live-view image can be displayed on both of the electronic viewfinder 8 and the backface monitor 12.

The shutter device 4 has a top curtain 4a and a second curtain 4b. After the top curtain 4a moves upward to an exposure starting position at the upper side of the opening portion of the shutter device 4, the top curtain 4a moves downward to an exposure ending position at the lower side again. Subsequently, the second curtain 4b moves so as to follow the top curtain 4a from the exposure starting position toward the exposure ending position. At this time, the exposure operation is performed through a slit formed between the top curtain 4a and the second curtain 4b.

1-2. Functional Block

Figure 4:
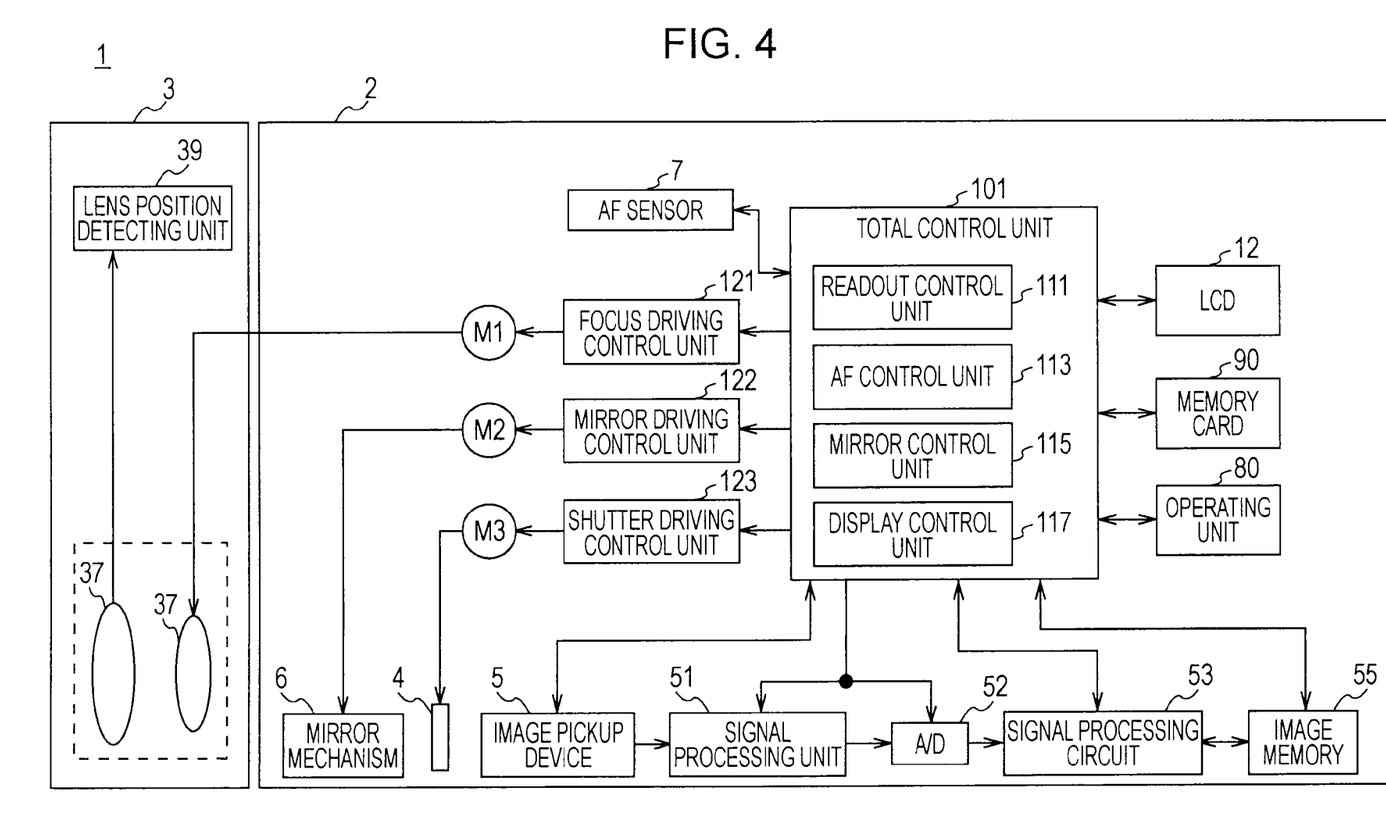
FIG. 4 is a block diagram showing a functional configuration of the image pickup apparatus.

Next, the outline of the functions of the image pickup apparatus 1 will be described with reference to FIG. 4. FIG. 4 is a block diagram showing a functional configuration of the image pickup apparatus 1.

As shown in FIG. 4, the image pickup apparatus 1 includes an operating unit 80, a total control unit 101, a focus driving control unit 121, a mirror driving control unit 122, a shutter driving control unit 123, and a digital signal processing circuit 53.

The operating unit 80 is composed of various buttons and switches including the release button 11 (refer to FIG. 1) and the like. The total control unit 101 performs various operations in response to operations input to the operating unit 80 by a user.

The total control unit 101 is composed as a microcomputer and includes mainly a CPU, a memory, a ROM (for example, EEPROM), and the like. The total control unit 101 reads out programs stored in the ROM and executes the programs by the CPU to perform various functions.

Specifically, the total control unit 101 has a readout control unit 111, an AF control unit 113, a mirror control unit 115, a display control unit 117, and the like.

The readout control unit 111 controls an operation of reading out an electric charge generated by photoelectric conversion in the image pickup device 5 as an electrical signal from the image pickup device 5. The read-out electrical signal is generated as an image signal.

The AF control unit (focusing control unit) 113 performs a focusing control operation of controlling a position of the focus lens in cooperation with the AF sensor 7, the focus driving control unit 121, and the like. Specifically, the AF control unit 113 performs an AF operation using the focus driving control unit 121 in accordance with a focusing state of a subject detected by the AF sensor 7. More specifically, a focusing lens position detected by the phase difference detecting AF sensor 7 is used as focusing information to move the focusing lens to the focusing lens position. In particular, the phase difference detecting AF sensor 7 is used, which enables a focusing lens position to be determined extremely fast, thereby performing an extremely-fast focusing operation.

The focus driving control unit 121 performs a focusing control operation in cooperation with the AF control unit 113 and the like. Specifically, the focus driving control unit 121 generates a control signal on the basis of a signal input from the AF control unit 113 to drive a motor M1 and moves the focus lens included in the lens group 37 of the photographing lens unit 3. Further, a position of the focus lens is detected by a lens position detecting unit 39 of the photographing lens unit 3, and data denoting the position of the focus lens is transmitted to the total control unit 101. In this way, the focus driving control unit 121 controls a motion of the focus lens in the direction of the optical axis AL or the like.

The mirror control unit 115 controls a position of the half mirror 6 in cooperation with the mirror driving control unit 122. Specifically, the mirror control unit 115 controls the state switching between a state in which the half mirror 6 is evacuated from the optical path (a mirror-up state) and a state in which the half mirror 6 is on the optical path (a mirror-down state). For example, as will be described later, the mirror control unit 115 changes a position of the half mirror 6 from the position PG1 to the position PG2 in response to the release button being pushed down so as to come into a full-push state S2.

The mirror driving control unit 122 generates a control signal on the basis of a signal input from the total control unit 101 to drive a motor M2 and switches the state of the half mirror 6 between a mirror-up state and a mirror-down state.

The display control unit 117 controls various display operations on the backface monitor 12. For example, the display control unit 117 controls an operation of displaying a subject image based on an image captured by the image pickup device 5 on the backface monitor 12 and/or the electronic viewfinder 8. More specifically, the display control unit 117 controls an operation of a live-view function, i.e., a function of sequentially displaying time-series images (live-view images) with respect to a subject on a display. Note that the live-view function may be expressed as a function of displaying an image of a subject in a moving manner on a display.

The shutter driving control unit 123 generates a control signal on the basis of a signal input from the total control unit 101 to drive a motor M3 and controls opening and closing of the shutter device 4.

The image pickup device 5 performs exposure of the subject image formed on a light-receiving plane (charge accumulation by photoelectric conversion) in response to a driving control signal (accumulation starting signal and accumulation ending signal) from the total control unit 101 and generates an image signal with respect to the subject image. Further, the image pickup device 5 outputs the image signal to a signal processing unit 51 in response to a readout control signal from the total control unit 101.

When predetermined analog signal processing is performed by the signal processing unit 51 on the image signal obtained in the image pickup device 5, the image signal after the analog signal processing is converted into digital image data by an analog-to-digital conversion circuit 52. The image data is input to the digital signal processing circuit 53.

The digital signal processing circuit 53 performs digital signal processing on the image data input from the analog-to-digital conversion circuit 52 and generates image data with respect to an image picked up. The digital signal processing circuit 53 includes a black level correction circuit, a white balance (WB) circuit, a gamma correction circuit, and the like that perform various kinds of digital image processing on image data. Note that the image signal (image data) processed by the digital signal processing circuit 53 is stored in an image memory 55. The image memory 55 is a high-speed access image memory to temporarily store generated image data and has a capacity of storing image data of a plurality of frames.

In actual photographing, after the total control unit 101 performs desired image processing (compression processing or the like) on the image data to be temporarily stored in the image memory 55, the image data is stored in the memory card 90.

Further, the image to be temporarily stored in the image memory 55 is displayed on the backface monitor 12 under the control of the display control unit 117 of the total control unit 101. Accordingly, a confirmation display (after-view display) in which an after-view image serving as an image for confirmation with respect to actual photographing is displayed in accordance with a photographing instruction, a playback display in which photographed images are played back, or the like is achieved.

Moreover, the time-series images (live-view images) to be temporarily stored in the image memory 55 are sequentially displayed on the backface monitor 12 or the like under the control of the display control unit 117. Thus, a live-view display is achieved.

1-3. Operations

Figure 5:
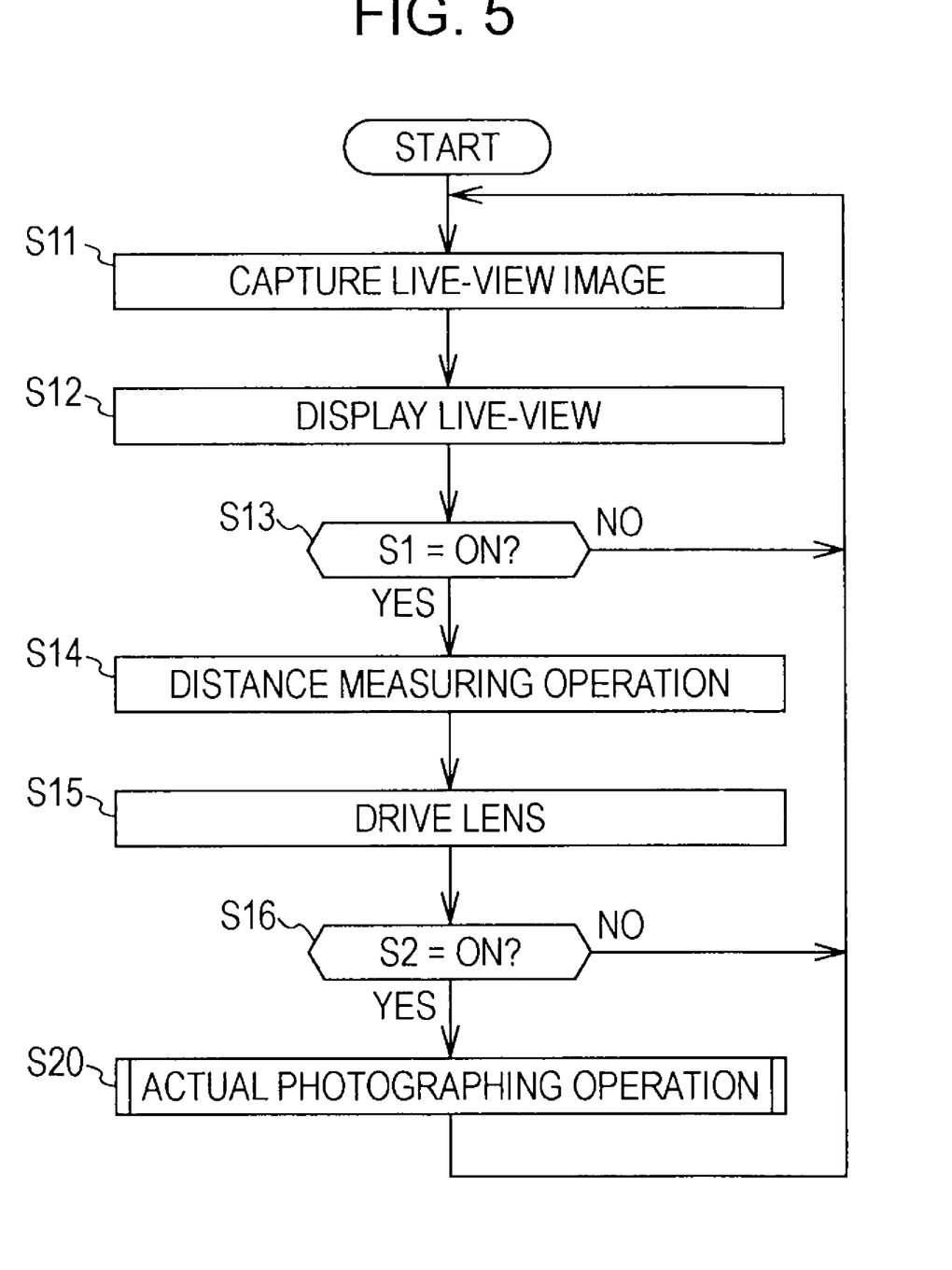
FIG. 5 is a flowchart illustrating photographing operations of the image pickup apparatus.
Figure 6:
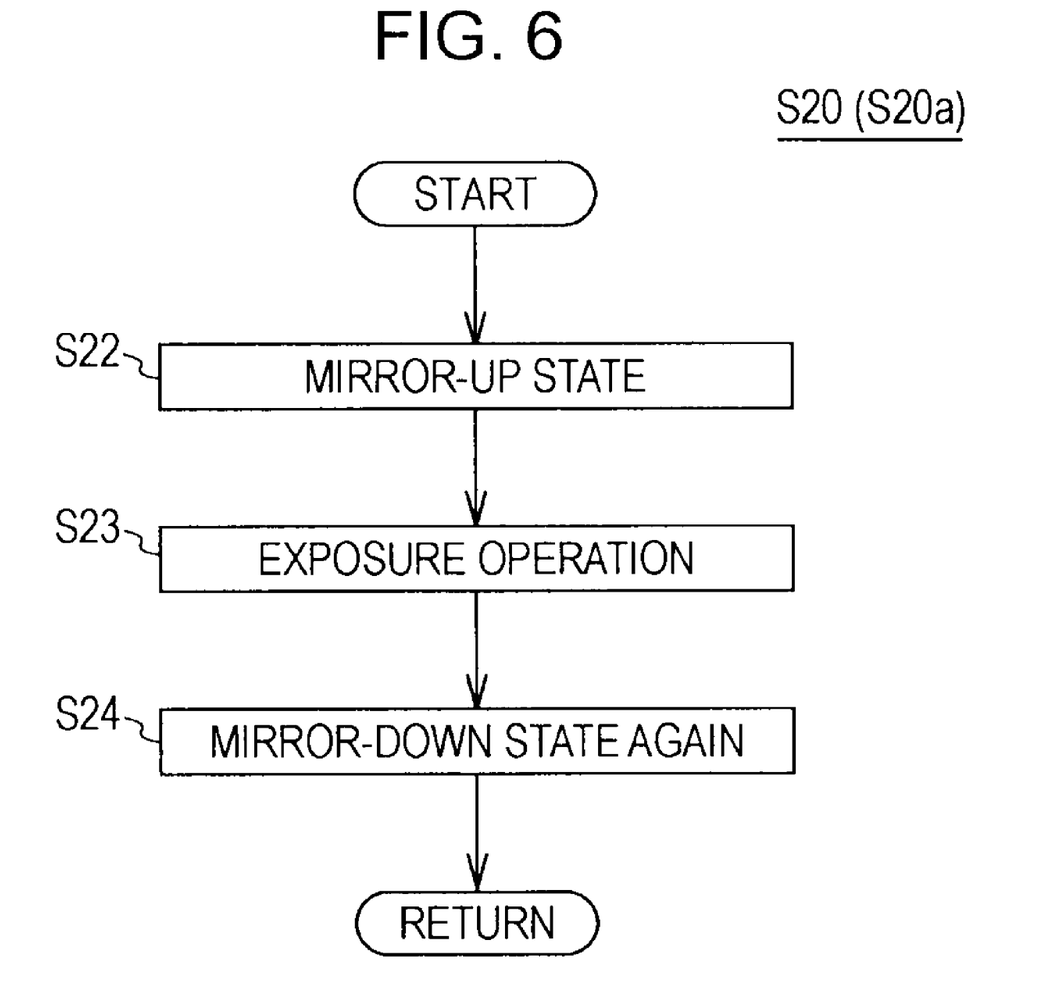
FIG. 6 is a flowchart illustrating part of the photographing operations of the image pickup apparatus in detail.

FIGS. 5 and 6 are flowcharts illustrating photographing operations of the image pickup apparatus 1. Hereinafter, the photographing operations of the image pickup apparatus 1 will be described with reference to FIGS. 5, 6 and others. Such photographing operations are achieved under the control of the total control unit 101.

In the image pickup apparatus 1, it is possible to determine a picture composition using a live-view image displayed on the backface monitor 12 and/or the electronic viewfinder 8. In other words, in the image pickup apparatus 1, at least one of the backface monitor 12 and the electronic viewfinder 8 can be selected to display a live-view image. Hereinafter, a case in which the backface monitor 12 is selected to display a live-view image will be mainly described. Note that the same operations are also performed in a case in which the electronic viewfinder 8 is selected to display a live-view image.

The description will be given with reference to FIG. 2. Before the release button 11 is brought into a full-push state S2 (i.e., before receiving a photographing instruction), the half mirror 6 is disposed in the position PG1 (refer to FIG. 2). In other words, the half mirror 6 is in a mirror-down state. That is, the half mirror 6 is provided on the optical path (photographing path) from the photographing lens unit 3 to the image pickup device 5.

At this time, subject image light from the photographing lens unit 3 passes through the half mirror 6 to reach the image pickup device 5.

The image pickup device 5 sequentially captures time-series images with respect to the subject image light (live-view images) on the basis of the subject image light incident on the image pickup device 5. Specifically, the image pickup device 5 sequentially generates a plurality of images at intervals of extremely short time Δt (for example, 1/60 seconds). The captured time-series images are sequentially displayed on the backface monitor 12. Accordingly, it is possible for a photographer to visually check moving images displayed on the backface monitor 12 (live-view images) and determine a picture composition using the moving images. In this way, a picture composition determining operation using a live-view image is performed.

Specifically, a live-view image is captured by the image pickup device 5 in step S11 (FIG. 5) and displayed on the backface monitor 12 in step S12. Such operations (steps S11 and S12) are repeated at intervals of extremely short time Δt until the release button 11 comes into a full-push state S2 (step S16).

Further, the half mirror 6 is disposed to be inclined at an angle of inclination α greater than 45 degrees (for example, 60 degrees) to the optical axis AL. Light beams traveling around the optical axis AL from the photographing lens unit 3 are reflected diagonally upper front by the half mirror 6 and incident on the AF sensor 7. The light beams incident on the AF sensor 7 are used for a phase difference detecting AF operation.

Specifically, when it is determined in step A13 that the release button 11 is pushed down so as to come into a half-push state S1, a photographing preparative operation (i.e., phase difference detecting AF operation described above) is performed.

More specifically, first, in step S14, an operation of calculating a defocus amount is performed using the light reflected on the half mirror 6 to come into the AF sensor 7. That is, a defocus amount is determined on the basis of a phase shift of the images of light beams on portions (for example, an upper part region and a lower part region of the optical axis AL) different from each other in the light incident on the AF sensor 7. The operation of calculating a defocus amount in step S14 is equivalent to an operation of calculating a distance to a subject into focus (subject distance) and is called a distance measuring operation as well.

Thereafter, in step S15, the focus lens is moved in the direction of the optical axis AL so as to correct the defocus amount calculated in step S14 to bring the subject into a focusing state. According to a phase difference detecting AF operation, it is possible to perform a high-speed focusing operation compared with a mountain-climbing (contrast method) AF operation.

In the following step S16, it is determined whether or not the release button 11 is pushed down so as to come into a full-push state S2. When the release button 11 is not pushed down so as to come into a full-push state S2, the process returns to step S11 again. On the other hand, when the release button 11 is pushed down so as to come into a full-push state S2, it is determined that the photographing instruction is received, and the process proceeds to an actual photographing operation in step S20 (20a) in response to the photographing instruction.

When the release button 11 is pushed to come into a full-push state S2 and the process proceeds to step S20, the half mirror 6 is driven so as to come into a mirror-up state (FIG. 3) (refer to step S22 in FIG. 6). That is, as shown in FIG. 3, at the time of exposure, the half mirror 6 moves to the mirror-up position PG2 to be evacuated from the optical path of the subject image light. Specifically, the half mirror 6 is evacuated upward so as not to block light (subject image light) from the photographing optical system. As a result, the light from the photographing lens unit 3 does not pass through the half mirror 6, but directly travels to reach the image pickup device 5 so as to correspond to a period of opening the shutter device 4.

Subsequently, an image signal of the subject is generated by photoelectric conversion in the image pickup device 5 on the basis of the subject image light reaching the image pickup device 5 in the period of opening the shutter device 4.

Specifically, after the top curtain 4a of the shutter device 4 moves upward to the exposure starting position above the opening portion of the shutter device 4, the top curtain 4a moves downward toward the exposure ending position below the opening portion again. Further, the second curtain 4b travels so as to follow the top curtain 4a from the exposure starting position toward the exposure ending position. The top curtain 4a and the second curtain 4b travel in a state in which the both are shifted from each other with a predetermined exposure period. At this time, an exposure operation is performed through the slit formed between the top curtain 4a and the second curtain 4b. With respect to certain pixels in the image pickup device 5, an exposure operation for the pixels is performed over a period TE (=T2−T1) from a clock time T1 when the exposure is started due to "the top curtain" passing through up to a clock time T2 when "the second curtain" covers the pixels to block light. A length of the period TE (for example, 1/100 seconds) corresponds to a shutter speed.

Further, an operation of reading out pixel values from the image pickup device 5 is performed to generate image data of an actual photographing image with respect to the subject (photographed image data). Further, the second curtain 4b moves to the exposure starting position above the opening portion of the shutter device 4 again.

In this way, subject image light from the photographing lens unit 3 does not pass through the half mirror 6, but is guided into the image pickup device 5 to obtain an actual photographing image.

Thereafter, the half mirror 6 is driven to be brought into a mirror-down state (FIG. 2) again (step S24). Subsequently, the process returns to step S11 again, and a live-view display is started again.

As described above, in accordance with the image pickup apparatus 1 according to the above-described embodiment, the half mirror 6 is provided so as to be movable between the mirror-down position PG1 on the optical path of subject image light from the photographing optical system and the mirror-up position PG2 to which the half mirror 6 is evacuated from the optical path of the subject image light. In particular, when the half mirror 6 is in the mirror-up position PG2, the image pickup device 5 generates an actual photographing image on the basis of subject image light reaching the image pickup device 5 from the photographing optical system without passing through the half mirror 6. Accordingly, it is possible to prevent a drop in quantity of light in actual photographing.

More specifically, before receiving a photographing instruction (in other words, at the time of determining a picture composition), the half mirror 6 is disposed in the mirror-down position PG1. Then, time-series images (live-view images) are generated on the basis of the subject image light passing through the half mirror 6 from the photographing optical system to reach the image pickup device 5. On the other hand, when receiving a photographing instruction, the half mirror 6 is moved to be disposed in the mirror-up position PG2 in response to the photographing instruction. Thus, an actual photographing image is generated on the basis of the subject image light reaching the image pickup device 5 from the photographing optical system without passing through the half mirror 6. Accordingly, because the half mirror 6 is evacuated from the optical path in actual photographing, it is possible to more reliably prevent a drop in quantity of light.

Further, the half mirror 6 in a mirror-down state (in the position PG1) is disposed at an angle of inclination α greater than 45 degrees to the optical axis AL. Because this angle of inclination α is greater than 45 degrees, the half mirror 6 can be made small. Hereinafter, this will be described in detail.

It is preferable that entire light beams travel from the photographing lens unit 3 toward the image pickup device 5 and pass through the half mirror 6 uniformly. Therefore, the half mirror 6 is preferably in a size sufficient for allowing light beams reaching the image pickup device 5 from the photographing lens unit 3 to pass through it. In other words, the half mirror 6 is preferably disposed in the mirror-down position PG1 so as to cover light beams (in detail, entire range thereof) reaching the image pickup device 5 from the photographing optical system.

Figure 7:
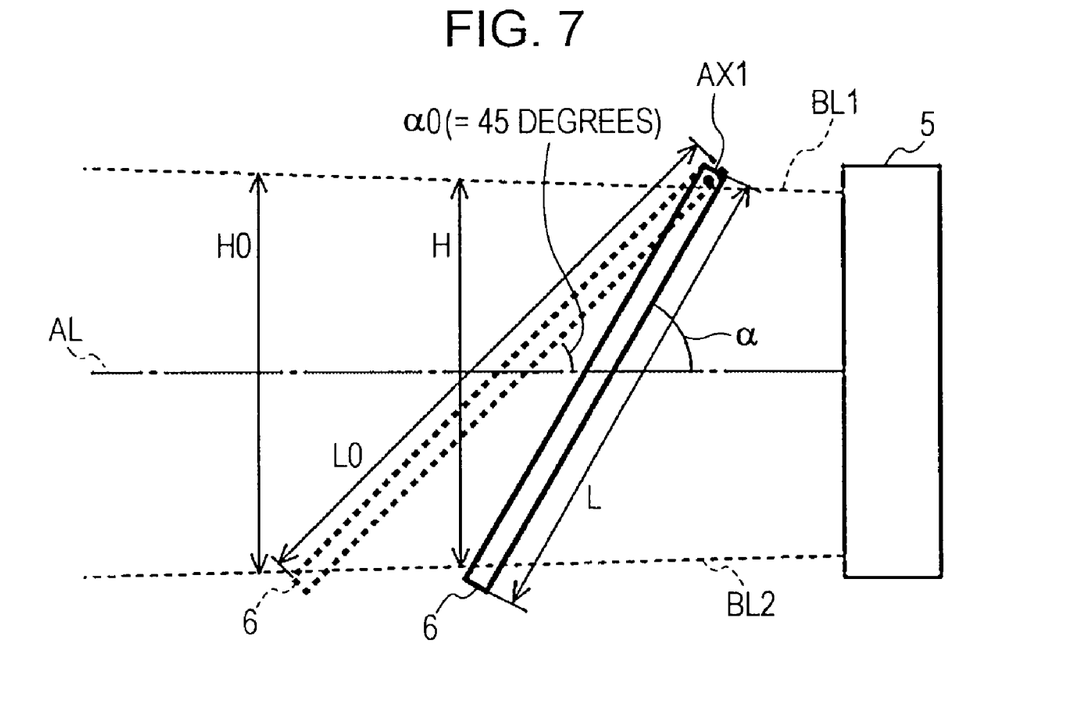
FIG. 7 is a diagram used for explanation of an angle of inclination $\alpha$ of a half mirror.

For example, as shown in FIG. 7, in a case in which an angle of inclination is 45 degrees (=α0), if the half mirror 6 has a length of L0, the half mirror 6 is capable of covering light beams reaching the image pickup device 5 from the photographing optical system. Here, the length L0 is expressed by, for example, L0=H0/sin(π/4), where H0 is a longitudinal (vertical) length for allowing entire light beams traveling from the photographing lens unit 3 toward the image pickup device 5 to pass through it. Note that, in FIG. 7, light beams within a region sandwiched by the uppermost broken line BL1 and the lowermost broken line BL2 reach the image pickup device 5 from the photographing lens unit 3.

In contrast, in a case in which an angle of inclination α is further greater than 45 degrees as shown in FIG. 2, a length L of the half mirror 6 may be a value less than the value L0. That is, the half mirror 6 can be made small. The half mirror 6 in a small size is useful particularly in a case in which there is a limit to a distance from the mount Mt to the image pickup device. Specifically, when the half mirror 6 moves to rotate around an axis AX1 up to the mirror-up position PG2, a radius of rotation of the half mirror 6 can be made small. Therefore, it is possible to easily prevent the outer circumference side of the rotating half mirror 6 from projecting toward the photographing lens unit 3 from the mount Mt.

For example, the length L is expressed by L=H/sin (α×π/180), where the value H is a vertical length for allowing entire light beams to travel from the photographing lens unit 3 toward the image pickup device 5.

Given that a value H is the same as a value H0, a ratio Ra of a value L and a value L0 is Ra=L/L0=sin(π/4)/sin(α×π/180).

Figure 8:
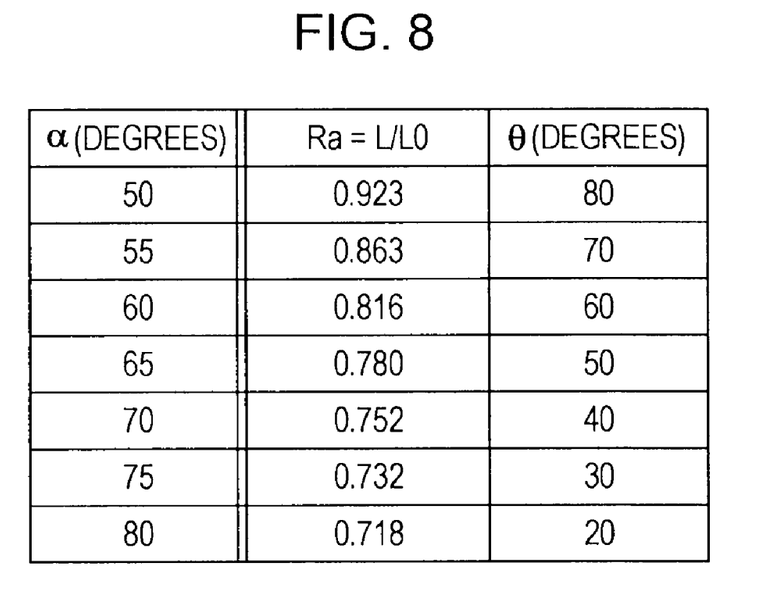
FIG. 8 is a table showing relationships between angles of inclination $\alpha$ and values Ra.

FIG. 8 is a table showing relationships between angles of inclination α and values Ra. For example, in a case of α=50 (degrees), a value Ra is 0.923. That is, a length L may be approximately 92 percents of the length L0.

In the same way, in a case of α=55 (degrees), a value Ra is 0.863. That is, a length L may be approximately 86 percents of the length L0.

Moreover, in a case of α=60 (degrees), a value Ra is 0.816. That is, a length L may be approximately 82 percents of the length L0.

In this way, an angle of inclination α is preferably a value greater than 45 degrees, for example, 50 degrees or more. Further, an angle of inclination α is more preferably 55 degrees or more, and is yet more preferably 60 degrees or more.

Figure 9:
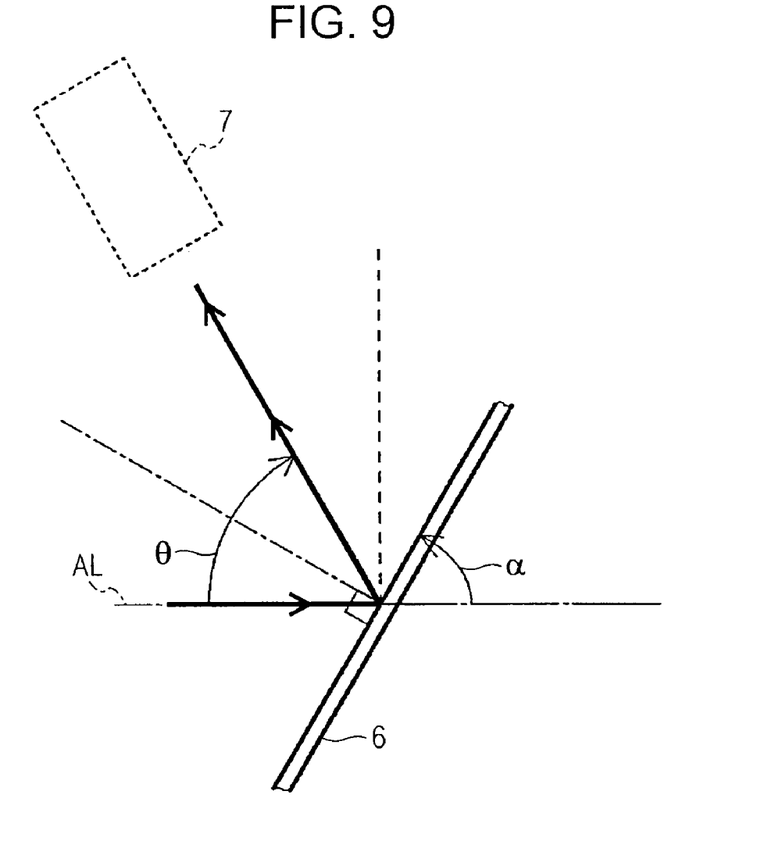
FIG. 9 is an enlarged view of a part of FIG. 7.

On the other hand, when an angle of inclination α is too large, it is difficult to receive light reflected from the half mirror 6 by the AF sensor 7 in the camera main body 2. FIG. 8 shows relationships between angles of inclination α and angles θ (refer to FIG. 9) as well. An angle θ is an angle formed between the optical axis AL and a reflected light beam reflected on the half mirror 6. Here, a relational expression that is θ=180−2×α (degrees) is derived from a geometric relationship.

In view of a place where the AF sensor 7 is disposed, an angle θ is preferably a relatively large value (for example, 30 degrees or 40 degrees or more). In other words, an angle α is preferably, for example, 75 degrees or 70 degrees or less. In particular, when there is a limit to a distance between the image pickup device and the mounting plane, an angle θ is preferably a relatively large value (an angle α is preferably a relatively small value. On the other hand, in a case in which a distance between the image pickup device and the mounting plane can be made relatively large, an angle θ may be a relatively small value (for example, θ=20 degrees (at this time, α=80 degrees)).

In this way, an angle of inclination α is preferably, for example, 80 degrees or less. Further, angle of inclination α is more preferably 75 degrees or less, and yet more preferably 70 degrees or less.

Figure 10:
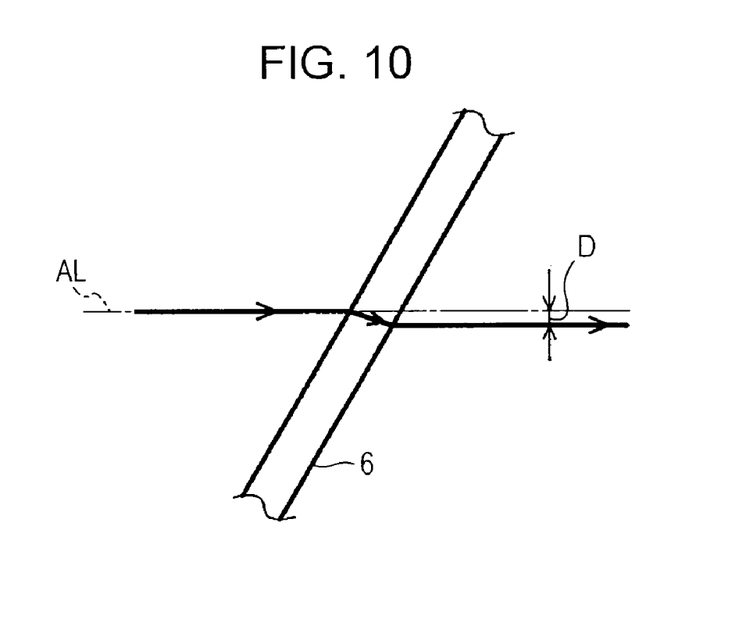
FIG. 10 is an enlarged view of a part of FIG. 7.

Further, as shown in an enlarged view of FIG. 10, in a plane PA which includes the optical axis AL and is parallel to a paper surface of FIG. 7, a route through which a light beam travels along the optical axis AL is moved due to a refraction phenomenon when the light beam passes through the half mirror 6. Specifically, after the light beam traveling along the optical axis AL passes through the half mirror 6, the light beam moves to the downside by a distance D from the original optical axis AL in a strict sense and travels in parallel with the optical axis AL. Note that, in a plane PB which includes the optical axis AL and is vertical to the plane PA (plane vertical to the paper surface of FIG. 10), a route through which a light beam travels is not shifted before and after the light beam passes through the half mirror 6.

The optical shift D in the plane PA is also expressed as an aberration similar to astigmatism. The above-described optical shift D may bring about a difference in definition depending on a direction in the same way as astigmatism.

Such an optical shift D is preferably small. When an angle of inclination α is made relatively large, the shift D becomes small. From the standpoint, an angle of inclination α is preferably a value greater than 45 degrees, and in particular, a value greater than or equal to 50 degrees as described above. Further, an angle of inclination α is more preferably 55 degrees or more, and an angle of inclination α is yet more preferably 60 degrees or more.

2. Second Embodiment

A second embodiment is a modification of the first embodiment. In the above-described first embodiment, the case in which the half mirror 6 is moved to the mirror-up position PG2 in response to a photographing instruction. An embodiment is not limited to this case. In the second embodiment, a mode in which a position of the half mirror 6 is changed in accordance with subject brightness in actual photographing will be described. Hereinafter, the difference from the first embodiment will be mainly described.

Figure 11:
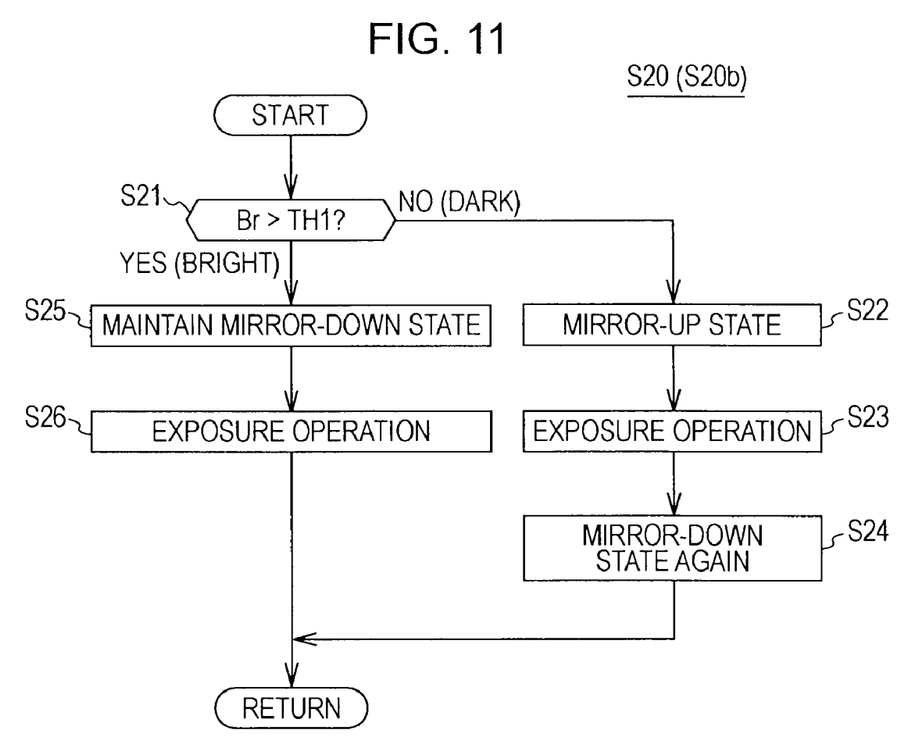
FIG. 11 is a flowchart illustrating operations in actual photographing according to a second embodiment.

FIG. 11 is a flowchart illustrating operations in actual photographing according to the second embodiment and illustrating detailed operations in step S20 (S20b). The operations other than step S20 are the same as in the first embodiment.

When the release button 11 is pushed down so as to come into a full-push state S2 (in step S16 in FIG. 5), and the process proceeds to step S21, it is determined whether or not subject brightness Br is greater than or equal to a predetermined value TH1. Subject brightness Br is determined using brightness of a live-view image captured by the image pickup device 5 in a picture composition determining state. For example, the average luminance value of all the pixels is calculated as subject brightness Br.

Further, the total control unit 101 and the mirror driving control unit 122 change a position of the half mirror 6 in accordance with the subject brightness.

Specifically, when the subject brightness Br is greater than the predetermined value TH1, the process proceeds to step S25. In other words, when the subject has a brightness higher than the reference value, the process proceeds to step S25. In this step S25, it is determined that a mirror-down state is maintained. That is, in the second embodiment, when the subject brightness Br is greater than the predetermined value TH1, the half mirror 6 is disposed in the mirror-down position PG1 even when having received a photographing instruction. The total control unit 101 and the mirror driving control unit 122 operate the shutter device 4 to perform an exposure operation with the half mirror 6 being disposed in the position PG1 (step 26). As a result, an actual photographing image is generated on the basis of the subject image light passing through the half mirror 6 from the photographing optical system to reach the image pickup device 5.

On the other hand, when the subject brightness Br is less than or equal to the predetermined value TH1, the process proceeds to step S22. In other words, when the subject has a brightness lower than the reference value, the process proceeds to step S22. Subsequently, the operations (steps S22, S23, and S24) which are the same as in the first embodiment are performed. That is, the half mirror 6 is disposed in the position PG2 in response to a photographing instruction and an actual photographing image is generated on the basis of the subject image light reaching the image pickup device 5 from the photographing optical system without passing through the half mirror 6.

In accordance with operations as described above, in photographing a dark subject in particular, it is possible to obtain a sufficient quantity of light for the subject by switching the half mirror 6 into a mirror-up state. Further, because the half mirror 6 may be not necessarily moved in photographing a relatively bright subject, power consumption can be reduced. Further, with respect to a relatively bright subject, the half mirror 6 can be functioned as a neutral density filter.

3. Modifications and the Like

The embodiments of the present invention have been described above. However, the present invention is not limited thereto.

For example, in the above-described embodiments, the case in which a phase difference detecting AF operation is performed when the release button 11 is pushed down so as to come into a half-push state S1 has been shown as an example. However, the present invention is not limited to this case. Specifically, further another embodiment of the present invention may be configured such that, in a picture composition determining operation, if the half mirror 6 is in the position PG1 (in a mirror-down state), a phase difference detecting AF operation is typically performed.

Further, in the above-described embodiments, the shutter device 4 has been shown as an example in which the top curtain and the second curtain are sequentially moved in a same direction to perform an exposure operation through the slit formed between the top curtain and the second curtain. However, the present invention is not limited to this case. For example, a shutter technology may be used in which an electronic top curtain (called "electron curtain" as well) is implemented by sequentially resetting accumulated electric charges of respective pixels in the image pickup device 5 for every horizontal line in the image pickup device 5.

Further, in the above-described embodiments, it is possible to display a live-view image on both of the electronic viewfinder 8 and the backface monitor 12. However, the present invention is not limited thereto. For example, the present invention may be an image pickup apparatus in which a live-view image is displayed on only one of the both.

The present application contains subject matter related to that disclosed in Japanese Priority Patent Application JP 2008-214918 filed in the Japan Patent Office on Aug. 25, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image pickup apparatus comprising:
a half mirror that separates light from a photographing optical system into transmitted light and reflected light;
a phase difference detecting AF sensor that receives the reflected light reflected on the half mirror to detect a focusing state by a phase difference detecting method;
an image pickup device that receives the transmitted light passing through the half mirror to generate time-series images with respect to subject image light from the photographing optical system; and a display means for sequentially displaying the time-series images generated by the image pickup device, wherein the half mirror is movable between a first position on an optical path of the subject image light from the photographing optical system and a second position to which the half mirror is removed from the optical path of the subject image light, when the half mirror is in the second position, the image pickup device generates an actual photographing image based on the subject image light reaching the image pickup device from the photographing optical system without passing through the half mirror, and when a subject brightness is greater than a predetermined value, regardless of reception of a photographing instruction, the half mirror is positioned in the first position and an actual photographing image is generated based on the subject image light passing through the half mirror from the photographing optical system to reach the image pickup device.

2. The image pickup apparatus according to claim 1, further comprising:

a control means for changing a position of the half mirror; and an input means for receiving the photographing instruction, wherein before receiving the photographing instruction, the control means positions the half mirror in the first position and causes the time-series images to be generated based on the subject image light passing through the half mirror from the photographing optical system to reach the image pickup device, and the control means positions the half mirror in the second position in response to the photographing instruction and causes the actual photographing image to be generated based on the subject image light reaching the image pickup device from the photographing optical system without passing through the half mirror.

3. The image pickup apparatus according to claim 2, wherein when the subject brightness is less than or equal to the predetermined value, the control means positions the half mirror in the second position in response to the photographing instruction and causes the actual photographing image to be generated based on the subject image light reaching the image pickup device from the photographing optical system without passing through the half mirror.

4. The image pickup apparatus according to claim 1, wherein the half mirror is positioned in the first position to cover light beams reaching the image pickup device from the photographing optical system.

5. The image pickup apparatus according to claim 4, wherein the half mirror is positioned in the first position to have a predetermined angle of inclination greater than 45 degrees to an optical axis of the photographing optical system.

6. The image pickup apparatus according to claim 5, wherein the predetermined angle of inclination is greater than or equal to 50 degrees and less than or equal to 80 degrees to the optical axis.

7. The image pickup apparatus according to claim 6, wherein the predetermined angle of inclination is greater than or equal to 60 degrees and less than or equal to 70 degrees to the optical axis.

8. An image pickup apparatus comprising:

a half mirror that separates light from a photographing optical system into transmitted light and reflected light;

a phase difference detecting AF sensor that receives the reflected light reflected on the half mirror to detect a focusing state by a phase difference detecting method;

an image pickup device that receives the transmitted light passing through the half mirror to generate time-series images with respect to subject image light from the photographing optical system; and a display that sequentially displays the time-series images generated by the image pickup device, wherein the half mirror is movable between a first position on an optical path of the subject image light from the photographing optical system and a second position to which the half mirror is removed from the optical path of the subject image light, when the half mirror is in the second position, the image pickup device generates an actual photographing image based on the subject image light reaching the image pickup device from the photographing optical system without passing through the half mirror, and when a subject brightness is greater than a predetermined value, regardless of reception of a photographing instruction, the half mirror is positioned in the first position and an actual photographing image is generated based on the subject image light passing through the half mirror from the photographing optical system to reach the image pickup device.

* * * * *